United States Patent
Ikenosako

(10) Patent No.: US 11,760,936 B2
(45) Date of Patent: Sep. 19, 2023

(54) FLAME RETARDANT FOR WOODY MATERIALS AND FLAME-RETARDANT WOODY MATERIAL

(71) Applicant: Daihachi Chemical Industry Co., Ltd., Osaka (JP)

(72) Inventor: Mina Ikenosako, Osaka (JP)

(73) Assignee: Daihachi Chemical Industry Co., Ltd., Osaka (JP)

( * ) Notice: Subject to any disclaimer, the term of this patent is extended or adjusted under 35 U.S.C. 154(b) by 740 days.

(21) Appl. No.: 16/618,701

(22) PCT Filed: May 30, 2018

(86) PCT No.: PCT/JP2018/020718
§ 371 (c)(1),
(2) Date: Dec. 2, 2019

(87) PCT Pub. No.: WO2018/221567
PCT Pub. Date: Dec. 6, 2018

(65) Prior Publication Data
US 2021/0147750 A1 May 20, 2021

(30) Foreign Application Priority Data
Jun. 1, 2017 (JP) ................. 2017-109571

(51) Int. Cl.
*C09K 21/12* (2006.01)
*B27K 3/02* (2006.01)
*B27K 3/50* (2006.01)
*C09K 21/04* (2006.01)
*C09K 21/10* (2006.01)

(52) U.S. Cl.
CPC ............ *C09K 21/12* (2013.01); *B27K 3/0207* (2013.01); *B27K 3/50* (2013.01); *C09K 21/04* (2013.01); *C09K 21/10* (2013.01); *B27K 2240/30* (2013.01)

(58) Field of Classification Search
CPC .......... C09K 21/04; C09K 21/10; C09K 21/12
See application file for complete search history.

(56) References Cited

U.S. PATENT DOCUMENTS

| 5,196,238 A | 3/1993 | Ott et al. | |
| 2006/0287418 A1 | 12/2006 | Bauer et al. | |
| 2015/0352744 A1* | 12/2015 | Zhang | B27K 3/0221 427/595 |
| 2018/0021975 A1* | 1/2018 | Tonani | B27K 3/52 427/325 |

FOREIGN PATENT DOCUMENTS

| CN | 1059945 A | 4/1992 |
| CN | 105907291 A | 8/2016 |
| JP | 53/073898 A | 6/1978 |
| JP | 03/169601 A | 7/1991 |
| JP | 2006/037101 A | 2/2006 |
| JP | 2006/219329 A | 8/2006 |
| JP | 2007/055271 A | 3/2007 |

(Continued)

OTHER PUBLICATIONS

Liu "Textbook of Processing Paper and Special Paper" China Light Industry Press, p. 58, 2012.

(Continued)

*Primary Examiner* — Peter F Godenschwager
(74) *Attorney, Agent, or Firm* — Cesari & McKenna, LLP

(57) ABSTRACT

An object of the present invention is to provide a flame-retardant woody material having low hygroscopicity and excellent flame-retardant performance, and a flame retardant for woody materials therefor. The present invention relates to a flame retardant for woody materials comprising an organic phosphorus compound represented by the following formula (1) and a nitrogen compound represented by the following formula (2); and also relates to a flame-retardant woody material comprising a woody material fireproofed with the flame retardant for woody materials:

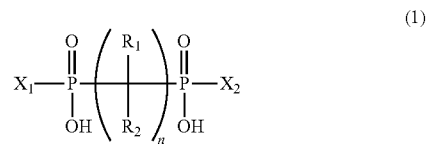

(1)

wherein in the formula (1), $R_1$ and $R_2$ are the same or different, and each represents a hydrogen atom, hydroxy, or the like; n is an integer of 1 to 4; $X_1$ and $X_2$ are the same or different, and each represents a hydrogen atom, hydroxy, or the like; and

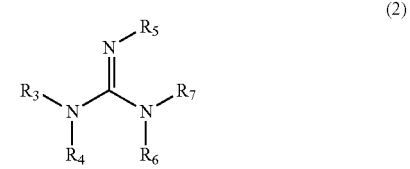
(2)

wherein in the formula (2), $R_3$, $R_4$, $R_5$, $R_6$, and $R_7$ are the same or different, and each represents a hydrogen atom, methyl, or the like.

18 Claims, No Drawings

(56) References Cited

FOREIGN PATENT DOCUMENTS

| | | |
|---|---|---|
| JP | 2007/160570 A | 6/2007 |
| JP | 2012/532239 A | 12/2012 |
| JP | 2016/007822 A | 1/2016 |
| TW | I502008 B | 10/2015 |
| WO | WO-2011/003773 A1 | 1/2011 |
| WO | WO-2016/125058 A1 | 8/2016 |

OTHER PUBLICATIONS

Office Action dated Feb. 4, 2021 for Chinese patent application No. 201880035320.7.

\* cited by examiner

FLAME RETARDANT FOR WOODY MATERIALS AND FLAME-RETARDANT WOODY MATERIAL

CROSS-REFERENCE TO RELATED APPLICATIONS

This application is the National Stage of International Application No. PCT/JP2018/020718, filed May 30, 2018, which claims priority to Japanese Application No. 2017-109,571, filed Jun. 1, 2017. The contents of both prior applications are hereby incorporated by reference herein in their entirety.

TECHNICAL FIELD

The present invention relates to a flame retardant for woody materials, and a flame-retardant woody material.

BACKGROUND ART

In interior materials or exterior materials for residential construction, in general, woody materials are widely used because of their good processability, light weight, and excellent strength and economic efficiency. On the other hand, woody materials tend to easily ignite and burn, and thus problematically have poor safety against fire.

Phosphoric acid-based or boric acid-based flame retardants have conventionally been used to fireproof such woody materials. These flame retardants are dissolved in water, and applied (coated) or impregnated as aqueous solutions to woody materials. Flame retardancy can be imparted by application (coating) only to the surface layer of woody materials; thus, in order to impart sufficient flame-retardant performance, an impregnation treatment that can introduce flame retardants into the inside of woody materials is preferable.

In order to improve flame-retardant performance, the following flame retardants are proposed (e.g., PTL 1 to Fit 4). PTL 1 discloses a flame-retardant agent for woody materials comprising an aqueous solution containing phosphonic acid and ammonia, wherein the amount of phosphonic acid is 35 to 55 mass %, and the amount of ammonia is 7.2 to 14 mass %, based on the total amount of the aqueous solution. PTL 2 discloses a fire-retardant solution comprising 100 parts by weight of water, 30 to 50 parts by weight of borax, 10 to 30 parts by weight of boric acid, 10 to 30 parts by weight of sodium hydrogen phosphate, and a small amount of coloring agent. Fit 3 discloses a liquid composition of a boron compound comprising boric acid and borax each in an amount exceeding the solubility of each single compound at a temperature heated above room temperature. PTL 4 discloses a non-combusting/semi-non-combusting chemical liquid of wood, wherein, in addition to guanidine phosphate, phosphoric acid is used as an auxiliary agent, and the weight ratio of water, guanidine phosphate, and phosphoric acid is 100:15 to 75:0 to 20. However, woody materials impregnated with the flame retardants for woody materials of Fit 1 to PTL 4 all have high hygroscopicity, which causes a defect such that the flame retardants seep out due to humidity. Particularly in the high-temperature and high-humidity environment of Japan, humidity causes heavy seepage of flame retardants even in environments that are not in direct contact with water and/or raindrops (e.g., indoors, underground, etc.); thus, flame-retardant woody materials are desired to have low hygroscopicity.

Accordingly, there has been a demand for the development of flame-retardant woody materials having sufficiently low hygroscopicity and excellent flame-retardant performance, even in a high-temperature and high-humidity environment.

CITATION LIST

Patent Literature

PTL 1: JP2016-7822A
PTL 2: JP2007-55271A
PTL 3: JP2006-219329A
PTL 4: JP2007-160570A

SUMMARY OF INVENTION

Technical Problem

An object of the present invention is to provide a flame-retardant woody material having low hygroscopicity and excellent flame-retardant performance, and to also provide a flame retardant for woody materials therefor.

Solution to Problem

The present inventor conducted extensive research to develop a flame-retardant woody material having low hygroscopicity and excellent flame-retardant performance, and consequently found that the above problem can be solved by using a flame retardant for woody materials obtained by combining an organic phosphorus compound having a specific structure and a nitrogen compound having a specific structure. The present invention has been completed based on this finding.

The present invention relates to the flame retardants for woody materials and flame-retardant woody materials shown in the following Items 1 to 17.

Item 1. A flame retardant for woody materials comprising:

an organic phosphorous compound represented by the following formula (1):

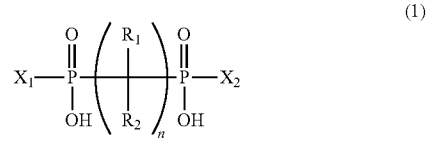

wherein in the formula (1), $R_1$ and $R_2$ are the same or different, and each represents a hydrogen atom, amino, hydroxy, mercapto, a halogen atom, or substituted or unsubstituted $C_{1-6}$ alkyl; where the substituted alkyl has one or more substituents selected from the group consisting of amino, hydroxy, mercapto, and a halogen atom; and the substituted or unsubstituted alkyl may contain, in its carbon chain, at least one heteroatom selected from the group consisting of an oxygen atom, a nitrogen atom, and a sulfur atom;

n is an integer of 1 to 4; and $X_1$ and $X_2$ are the same or different, and each represents a hydrogen atom, hydroxy, or Cis alkyl unsubstituted or substituted with hydroxy; and a nitrogen compound represented by the following formula (2):

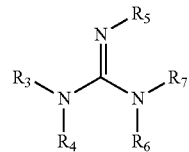

(2)

wherein in the formula (2), $R_3$ represents a hydrogen atom, methyl, ethyl, n-propyl, or isopropyl;

$R_4$, $R_5$, and $R_6$ are the same or different, and each represents a hydrogen atom, methyl, ethyl, n-propyl, isopropyl, phenyl, o-tolyl, m-tolyl, or p-tolyl; and $R_7$ represents a hydrogen atom, methyl, ethyl, n-propyl, isopropyl, amino, cyano, nitro, nitroso, —C(═O)—NH$_2$, or —C(═NH)—NH$_2$.

Item 2. The flame retardant for woody materials according to Item 1, wherein the organic phosphorous compound is a compound of the formula (1), wherein:

$R_1$ is a hydrogen atom or hydroxy,
$R_2$ is a hydrogen atom or $C_{1-6}$ alkyl,
$X_1$ and $X_2$ are hydroxy, and
n is 1.

Item 3. The flame retardant for woody materials according to Item 1 or 2, wherein the nitrogen compound is a compound of the formula (2), wherein:

$R_3$, $R_4$, $R_5$, and $R_6$ are a hydrogen atom, and
$R_7$ is a hydrogen atom, amino, cyano, nitro, nitroso, —C(═O)—NH$_2$, or —C(═NH)—NH$_2$.

Item 4. The flame retardant for woody materials according to any one of Items 1 to 3, wherein the nitrogen compound is contained in an amount of 0.7 molar equivalents or more and 1.6 molar equivalents or less relative to the acid value of the organic phosphorous compound.

Item 5. The flame retardant for woody materials according to any one of Items 1 to 4, further comprising an inorganic phosphorus compound represented by the following formula (3):

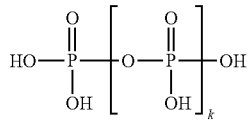

(3)

wherein in the formula (3), k is an integer of 0 or more and 100 or less.

Item 6. The flame retardant for woody materials according to Item 5, wherein the nitrogen compound is contained in an amount 0.95 times or more and 1.4 times or less the sum of 1 molar equivalent relative to the acid value of the organic phosphorous compound and 1 molar equivalent relative to the acid value of the inorganic phosphorus compound.

Item 7. The flame retardant for woody materials according to Item 5 or 6, wherein the nitrogen compound is contained in an amount 0.97 times or more and 1.2 times or less the sum of 1 molar equivalent relative to the acid value of the organic phosphorous compound and 1 molar equivalent relative to the acid value of the inorganic phosphorus compound.

Item 8. The flame retardant for woody materials according to any one of Items 5 to 7, wherein the inorganic phosphorus compound is a compound of the formula (3), wherein k is 0 or 1.

Item 9. The flame retardant for woody materials according to any one of Items 5 to 8, wherein the mixing ratio of the organic phosphorous compound and the inorganic phosphorus compound is 1:99 to 75:25 by a mass ratio.

Item 10. A flame-retardant woody material comprising a woody material that is fireproofed with the flame retardant for woody materials according to any one of Items 1 to 9.

Item 11. A flame-retardant woody material comprising, in a woody material, the flame retardant for woody materials according to any one of Items 1 to 9 at an impregnation ratio of 5% or more, the impregnation ratio being represented by the following formula (a):

$$\text{(Impregnation ratio (\%))} = \frac{\text{(Mass of flame retardant for woody materials contained in flame-retardant woody material (g))}}{\text{(Mass of woody material (g))}} \times 100 \quad \text{(a)}$$

Item 12. A flame-retardant woody material comprising, in a woody material, a flame retardant for woody materials comprising an organic phosphorous compound and a nitrogen compound at an impregnation ratio of 20% or more;

wherein the amount of the nitrogen compound contained in the flame retardant for woody materials is 1 molar equivalent or more relative to the acid value of the organic phosphorous compound;

the organic phosphorous compound is represented by the following formula (1):

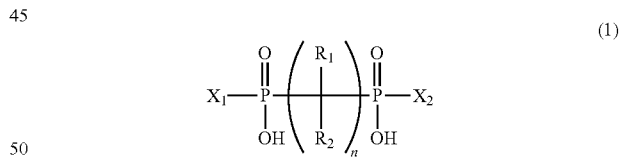

(1)

wherein in the formula (1), $R_1$ and $R_2$ are the same or different, and each represents a hydrogen atom, amino, hydroxy, mercapto, a halogen atom, or substituted or unsubstituted $C_{1-6}$ alkyl; where the substituted alkyl has one or more substituents selected from the group consisting of amino, hydroxy, mercapto, and a halogen atom; and the substituted or unsubstituted alkyl may contain, in its carbon chain, at least one heteroatom selected from the group consisting of an oxygen atom, a nitrogen atom, and a sulfur atom;

n is an integer of 1 to 4; and $X_1$ and $X_2$ are the same or different, and each represents a hydrogen atom, hydroxy, or $C_{1-6}$ alkyl unsubstituted or substituted with hydroxy;

the nitrogen compound is represented by the following formula (2):

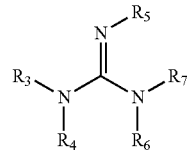
(2)

wherein in the formula (2), $R_3$ represents a hydrogen atom, methyl, ethyl, n-propyl, or isopropyl;

$R_4$, $R_5$, and $R_6$ are the same or different, and each represents a hydrogen atom, methyl, ethyl, n-propyl, isopropyl, phenyl, o-tolyl, m-tolyl, or p-tolyl;

$R_7$ represents a hydrogen atom, methyl, ethyl, n-propyl, isopropyl, amino, cyano, nitro, nitroso, —C(=O)—NH$_2$, or —C(=NH)—NH$_2$; and the impregnation ratio is represented by the following formula (a):

(Impregnation ratio (%)) = (a)

$$\frac{\text{(Mass of flame retardant for woody materials contained in flame-retardant woody material (g))}}{\text{(Mass of woody material (g))}} \times 100$$

Item 13. The flame-retardant woody material according to Item 12, wherein the organic phosphorous compound is a compound of the formula (1), wherein:

$R_1$ is a hydrogen atom or hydroxy;
$R_2$ is a hydrogen atom or C1s alkyl;
$X_1$ and $X_2$ are hydroxy; and
n is 1.

Item 14. The flame-retardant woody material according to Item 12 or 13, wherein the nitrogen compound is a compound of the formula (2), wherein:

$R_3$, $R_4$, $R_5$, and $R_6$ are hydrogen atoms; and
$R_7$ is a hydrogen atom, amino, cyano, nitro, nitroso, —C(=O)—NH$_2$, or —C(=NH)—NH$_2$.

Item 15. The flame-retardant woody material according to any one of Items 12 to 14, wherein the impregnation ratio is 40% or more.

Item 16. The flame-retardant woody material according to any one of Items 12 to 15, wherein the impregnation ratio is 80% or more.

Item 17. The flame-retardant woody material according to any one of Items 12 to 16, wherein the amount of the nitrogen compound contained in the flame retardant for woody materials is 1.6 molar equivalents or less relative to the acid value of the organic phosphorous compound.

Advantageous Effects of Invention

The flame retardant for woody materials of the present invention has low hygroscopicity and excellent flame retardancy. The flame-retardant woody material of the present invention comprises the flame retardant for woody materials in a woody material, and thus can exhibit sufficiently low hygroscopicity and excellent flame-retardant performance.

DESCRIPTION OF EMBODIMENTS

The present invention is described in detail below.
1. Flame Retardant for Woody Materials The flame retardant for woody materials of the present invention is characterized by comprising an organic phosphorous compound and a nitrogen compound. Further, the flame retardant for woody materials of the present invention may comprise an inorganic phosphorus compound, if necessary.

1-1. Organic Phosphorous Compound

The organic phosphorous compound used herein is a compound represented by the following formula (1):

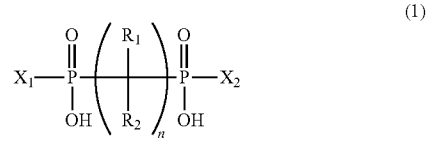
(1)

wherein $R_1$, $R_2$, $X_1$, $X_2$, and n are as defined above (hereinafter also referred to as the "organic phosphorous compound (1)").

In the present specification, examples of the halogen atom include a fluorine atom, a chlorine atom, a bromine atom, an iodine atom, and the like.

In the present specification, examples of $C_{1-6}$ alkyl include linear alkyl, such as methyl, ethyl, n-propyl, and n-butyl; and branched alkyl, such as isopropyl, isobutyl, sec-butyl, and tert-butyl.

In the present specification, examples of heteroatoms include an oxygen atom, a sulfur atom, a nitrogen atom, and the like.

When $R_1$ and $R_2$ are substituted $C_{1-6}$ alkyl, the substituted alkyl has one or more substituents selected from the group consisting of amino, hydroxy, mercapto, and a halogen atom. The substituent is preferably hydroxyl. The number of substituents is preferably 1 or 2, and more preferably 1. Moreover, $R_1$ and $R_2$ are more preferably unsubstituted $C_{1-6}$ alkyl (also simply referred to as "$C_{1-6}$ alkyl"), and even more preferably unsubstituted $C_{1-4}$ alkyl (also simply referred to as "$C_{1-4}$ alkyl").

When $X_1$ and $X_2$ are $C_{1-6}$ alkyl substituted with hydroxy, the number of hydroxyl groups is preferably 1 or 2, and more preferably 1.

The phrase "may contain" in the formula (1) means that the substituted or unsubstituted $C_{1-6}$ alkyl as $R_1$ and $R_2$ contain or do not contain at least one heteroatom mentioned above in their carbon chains. The number of heteroatoms is preferably 0 to 2, more preferably 0 or 1, and even more preferably 0, which means that no heteroatom is contained.

Among these, the organic phosphorous compound (1) is preferably a compound of the formula (1), wherein $R_1$ is a hydrogen atom or hydroxy, $R_2$ is a hydrogen atom or $C_{1-6}$ alkyl, $X_1$ and $X_2$ are hydroxy, and n is 1.

The organic phosphorous compound (1) is more preferably a compound of the formula (1), wherein $R_1$ is hydroxy, $R_2$ is a hydrogen atom or $C_{1-4}$ alkyl, $X_1$ and $X_2$ are hydroxy, and n is 1.

The organic phosphorous compound (1) is even more preferably a compound of the formula (1), wherein $R_1$ is hydroxy, $R_2$ is methyl, $X_1$ and $X_2$ are hydroxy, and n is 1.

Specific examples of the organic phosphorous compound (1) include ethylenebisphosphonic acid, dimethylaminomethylenebisphosphonic acid, 1-hydroxyethylenebisphosphonic acid, 1-aminoethylenebisphosphonic acid, fluoromethylenebisphosphonic acid, tert-butylhydroxymethylenebisphosphonic acid, chloromethylenebisphosphonic acid, dibromomethylenebisphosphonic acid, bis(2-hydroxyethyl)aminomethylenebisphosphonic acid, tetramethylenebisphosphonic acid, methylenebisphosphonic acid, difluoromethylenebisphosphonic acid, clodronic acid, pamidronic acid, (aminomethylene)bisphosphonic acid, 1-hydroxyethane-1,1-diphosphonic acid, 1,3-propanediylbisphosphonic acid, 3-aminopropylidenebisphosphonic acid, oxidronic acid, ethylidenebisphosphonic acid, 1-fluoroethylidenebisphosphonic acid, 1-hydroxy-2-(methylamino)ethylidenebisphosphonic acid, 1-aminoethylidenebisphosphonic acid, 2-(3-mercaptopropylthio)ethylidenebisphosphonic acid, 2-hydroxyethylidenebisphosphonic acid, 1-amino-2-hydroxyethylidenebisphosphonic acid, 1-hydroxy-2-(dimethylamino)ethylidenebisphosphonic acid, 2-mercaptoethylidenebisphosphonic acid, 1-hydroxy-2-aminoethylidenebisphosphonic acid, 2-(dimethylamino)ethylidenebisphosphonic acid, 1-(dimethylamino)-2-hydroxyethylidenebisphosphonic acid, 1-(methylamino)-2-hydroxyethylidenebisphosphonic acid, propylidenebisphosphonic acid, olpadronic acid, 1-fluoropropylidenebisphosphonic acid, 1-hydroxypropylidenebisphosphonic acid, isopropylidenebisphosphonic acid, 3-aminopropylidenebisphosphonic acid, butylidenebisphosphonic acid, 1-fluorobutylidenebisphosphonic acid, 1-hydroxybutylidenebisphosphonic acid, alendronate, 1-fluoropentylidenebisphosphonic acid, 1-fluorohexylidenebisphosphonic acid, 1-hydroxy-2-(methylamino)ethylidenebisphosphonic acid, heptylidenebisphosphonic acid, 1-hydroxyhexylidenebisphosphonic acid, hexylidenebisphosphonic acid, pentylidenebisphosphonic acid, 1-hydroxy-4-methylpentylidenebisphosphonic acid, 1-hydroxyheptylidenebisphosphonic acid, methylenebisphosphinic acid, ethylenebisphosphinic acid, 1,2-propylenebisphosphinic acid, 1,3-propylenebisphosphinic acid, 1,4-butylenebisphosphinic acid, ethylene-bis-(hydroxymethyl)-phosphinic acid, ethylene-bis-(1-hydroxyethyl)-phosphinic acid, ethylene-bis-(1-hydroxy-1-methylethyl)-phosphinic acid, ethylene-bis-(2-hydroxy-2-propyl)-phosphinic acid, ethylene-bis-(1-hydroxy-1-methyl-1-propyl)-phosphinic acid, 1,2-propylene-bis-(1-hydroxy-1-methylethyl)-phosphinic acid, and the like.

Among these, the organic phosphorous compound (1) is preferably tert-butylhydroxymethylenebisphosphonic acid, methylenebisphosphonic acid, 1-hydroxyethane-1,1-diphosphonic acid, oxidronic acid, ethylidenebisphosphonic acid, propylidenebisphosphonic acid, 1-hydroxypropylidenebisphosphonic acid, butylidenebisphosphonic acid, 1-hydroxybutylidenebisphosphonic acid, heptylidenebisphosphonic acid, hexylidenebisphosphonic acid, pentylidenebisphosphonic acid, 1-hydroxyhexylidenebisphosphonic acid, hexylidenebisphosphonic acid, 1-hydroxy-4-methylpentylidenebisphosphonic acid, 1-hydroxyheptylidenebisphosphonic acid, or the like.

The organic phosphorous compound (1) is more preferably tert-butylhydroxymethylenebisphosphonic acid, 1-hydroxyethane-1,1-diphosphonic acid, oxidronic acid, 1-hydroxypropylidenebisphosphonic acid, or 1-hydroxybutylidenebisphosphonic acid.

The organic phosphorous compound (1) is even more preferably 1-hydroxyethane-1,1-diphosphonic acid.

1-2. Nitrogen Compound

The nitrogen compound used herein is a compound represented by the following formula (2):

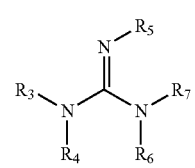

wherein $R_3$, $R_4$, $R_5$, $R_6$, and $R_7$ are as defined above (hereinafter also referred to as "the nitrogen compound (2)").

The nitrogen compound (2) is preferably a compound of the formula (2), wherein $R_3$, $R_4$, $R_5$, and $R_6$ are hydrogen atoms; and $R_7$ is a hydrogen atom, amino, cyano, nitro, nitroso, —C(=O)—NH$_2$, or —C(=NH)—NH$_2$.

The nitrogen compound (2) is more preferably a compound of the formula (2), wherein $R_3$, $R_4$, $R_5$, and $R_6$ are hydrogen atoms, and $R_7$ is a hydrogen atom, —C(=O)—NH$_2$, or —C(=NH)—NH$_2$.

The nitrogen compound (2) is even more preferably a compound of the formula (2), wherein $R_3$, $R_4$, $R_5$, $R_6$, and $R_7$ are hydrogen atoms.

Specific examples of the nitrogen compound (2) include guanidine, aminoguanidine, dicyandiamide, nitroguanidine, 1-nitrosoguanidine, guanylurea, biguanide, metformin, 1-methylguanidine, 1-ethylguanidine, 1-n-propylguanidine, 1-isopropylguanidine, 2-methylguanidine, 2-ethylguanidine, 2-n-propylguanidine, 2-isopropylguanidine, pentamethylguanidine, 1-phenylguanidine, 1,3-diphenylguanidine, 1,2,3-triphenylguanidine, 1-(o-tolyl)guanidine, 1-(o-tolyl)biguanide, and the like.

Among these, the nitrogen compound (2) is preferably guanidine, aminoguanidine, dicyandiamide, nitroguanidine, 1-nitrosoguanidine, guanylurea, biguanide, or the like.

The nitrogen compound (2) is more preferably guanidine, guanylurea, or biguanide.

The nitrogen compound (2) is even more preferably guanidine.

The nitrogen compound (2) may be a salt. Examples of salts of the nitrogen compound (2) include carbonic acid salts, hydrochloric acid salts, nitric acid salts, sulfuric acid salts, hydrogen bromide salts, hydrogen iodide salts, sulfamic acid salts, thiocyanic acid salts, etc., of the nitrogen compound (2). In the present specification, nitrogen compounds include salts of the nitrogen compounds.

The ratio of the organic phosphorous compound (1) and the nitrogen compound (2) contained in the flame retardant for woody materials is expressed by the molar equivalent of the nitrogen compound (2) relative to the acid value of the organic phosphorous compound (1). This ratio is not limited. For example, the nitrogen compound (2) is preferably contained in an amount of 0.7 molar equivalents or more, more preferably 0.85 molar equivalents or more, and even more preferably 0.95 molar equivalents or more, relative to the acid value of the organic phosphorous compound (1). In contrast, the nitrogen compound (2) is preferably contained in an amount of 1.6 molar equivalents or less, and more preferably 1.3 molar equivalents or less, relative to the acid value of the organic phosphorous compound (1).

In the present specification, the acid value of the organic phosphorous compound (1) is a numerical value determined in such a manner that when the neutralization point (inflection point), in which pH appears in a range of 7 or more and 11 or less, is defined as an end point, the numerical value is determined from the amount of solution required to reach the end point. The acid value is measured in accordance with the potentiometric titration method of JIS K 0070 using the organic phosphorous compound (1) or a solution thereof as a sample, and using an alkali solution for titration 1-3. Inorganic Phosphorus Compound The flame retardant for woody materials of the present invention may comprise, if necessary, an inorganic phosphorus compound represented by the following formula (3):

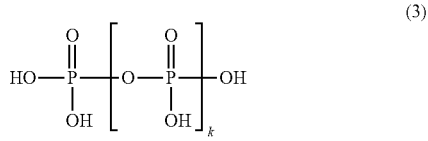

wherein in the formula (3), k is an integer of 0 or more and 100 or less (hereinafter also referred to as "the inorganic phosphorus compound (3)").

When the flame retardant for woody materials of the present invention further comprises an inorganic phosphorus compound (3), in addition to an organic phosphorous compound (1) and a nitrogen compound (2), the storage stability of the flame retardant for woody materials can be improved. The term "storage stability" in the present specification means that solids are not precipitated when the flame retardant for woody materials is stored or allowed to stand for a long period of time in a state of being dissolved or dispersed in a solvent (a solution or a suspension).

Because the storage stability of the flame retardant for woody materials of the present invention is improved, crystal precipitation can be suppressed even when the flame retardant for woody materials is stored in the form of a solution or the like containing a high concentration of the flame retardant for woody materials. This can reduce the transportation costs for the flame retardant for woody materials of the present invention. Further, woody materials are impregnated with the solution or the like containing a high concentration of the flame retardant for woody materials to improve the ratio of impregnation to the woody materials, thereby contributing to much higher fireproofing of the woody materials. The flame retardant for woody materials of the present invention further comprising an inorganic phosphorus compound can also be used after being suitably diluted, depending on the desired flame-retardant performance.

The inorganic phosphorus compound (3) is preferably a compound of the formula (3), wherein k is an integer of 0 or 1, and more preferably 1.

Specific examples of the inorganic phosphorus compound (3) include phosphoric acid, pyrophosphoric acid, polyphosphoric acid, and the like.

Among these, the inorganic phosphorus compound (3) is preferably phosphoric acid or pyrophosphoric acid, and more preferably pyrophosphoric acid.

When the flame retardant for woody materials comprises an organic phosphorous compound (1), a nitrogen compound (2), and an inorganic phosphorus compound (3), the ratio of the three components is not limited. For example, the nitrogen compound (2) is preferably contained in an amount 0.95 times or more, more preferably 0.97 times or more, and even more preferably 0.98 times or more, the sum of 1 molar equivalent relative to the acid value of the organic phosphorous compound (1) and 1 molar equivalent relative to the acid value of the inorganic phosphorus compound (3). When the nitrogen compound (2) is contained so as to satisfy the above conditions, a flame-retardant woody material having much lower hygroscopicity can be obtained. In contrast, the nitrogen compound (2) is preferably contained in an amount 1.4 times or less, more preferably 1.2 times or less, even more preferably 1.1 times or less, and particularly preferably 1.05 times or less, the sum of 1 molar equivalent relative to the acid value of the organic phosphorous compound (1) and 1 molar equivalent relative to the acid value of the inorganic phosphorus compound (3).

The acid value of the organic phosphorous compound (1) and the measurement method thereof are the same as described above. In the present specification, the acid value of the inorganic phosphorus compound (3) is a numerical value determined in such a manner that when the neutralization point (inflection point), in which pH appears in a range of 7 or more and 11 or less, is defined as an end point, the numerical value is determined from the amount of solution required to reach the end point. The acid value is measured in accordance with the potentiometric titration method of JIS K 0070 using the inorganic phosphorus compound (3) alone or a solution thereof as a sample, and using an alkali solution for titration.

When the flame retardant for woody materials comprises both an organic phosphorous compound (1) and an inorganic phosphorus compound (3) as phosphorus compounds, the ratio of the organic phosphorous compound (1) and the inorganic phosphorus compound (3) is preferably 1:99 to 75:25, and more preferably 10:90 to 70:30, by a mass ratio, in terms of imparting storage stability.

The flame retardant composition of the present invention can be used as a flame retardant solution or a flame retardant suspension by adding a solvent. Examples of solvents include water, methanol, ethanol, ethyl acetate, acetone, benzene, toluene, xylene, chlorobenzene, carbon disulfide, and the like. The concentration of the flame retardant composition in the flame retardant solution or the flame retardant suspension is not limited. The flame retardant solution or the flame retardant suspension preferably contains the flame retardant composition at a solids content of 4 mass % or more, more preferably 8 mass % or more, even more preferably 15 mass % or more, and particularly preferably 25 mass % or more. The upper limit of the concentration is also not limited. The flame retardant solution or the flame retardant suspension preferably contains the flame retardant composition at a solids content of 60 mass % or less, and more preferably 50 mass % or less.

In the flame retardant for woody materials of the present invention, the nitrogen compound (2) and the organic phosphorous compound (1) are bonded together to form a salt. Moreover, when the flame retardant for woody materials of the present invention further comprises an inorganic phosphorus compound (3), the nitrogen compound (2) and the organic phosphorous compound (1), and the nitrogen compound (2) and the inorganic phosphorus compound (3) are each bonded to form salts. These salts do not exhibit deliquescence or hygroscopicity, which are observed in conventionally known flame retardants for woody materials. Therefore, when the flame retardant for woody materials of the present invention is contained in woody materials, seepage of the flame retardant due to humidity can be sufficiently suppressed.

2. Flame-Retardant Woody Material

The flame-retardant woody material of the present invention comprises a woody material fireproofed with the flame retardant for woody materials mentioned above. Therefore, the flame-retardant woody material of the present invention comprises the above-mentioned flame retardant for woody materials in a woody material. Because the flame-retardant woody material comprises an organic phosphorous compound having a specific structure, a nitrogen compound having a specific structure, and optionally an inorganic phosphorus compound having a specific structure at a specific ratio, it can exhibit sufficiently low hygroscopicity and excellent flame retardancy.

The amount of the flame retardant for woody materials contained in the flame-retardant woody material is not limited. The content can be suitably adjusted depending on the desired flame-retardant performance. For example, the impregnation ratio represented by the following formula (a) may be 5% or more, 10% or more, or 15% or more.

In the flame-retardant woody material of the present invention, the total heat release and the maximum heat release rate according to ISO 5660-1 are reduced, compared with woody materials that are not fireproofed. This reveals that the flame retardant for woody materials of the present invention can impart, to woody materials, an effect of suppressing fire spread after contact with fire, and an effect of suppressing firing and ignition during contact with fire.

In terms of suppressing firing and ignition during contact with fire, the flame-retardant woody material of the present invention preferably contains the flame retardant for woody materials at an impregnation ratio, as represented by the following formula (a), of 20% or more.

$$\text{(Impregnation ratio (\%))} = \frac{\text{(Mass of flame retardant for woody materials contained in flame-retardant woody material (g))}}{\text{(Mass of woody material (g))}} \times 100 \quad \text{(a)}$$

Because the flame retardant for woody materials is contained at an impregnation ratio of 20% or more, the flame-retardant woody material of the present invention can exhibit more excellent flame-retardant performance. The lower limit of the impregnation ratio is preferably 40% or more, and more preferably 80% or more. The upper limit of the impregnation ratio is not limited. In terms of the handling of the flame-retardant woody material during transportation or building work, the upper limit of the impregnation ratio is preferably 170% or less, and more preferably 130% or less.

The shape of the woody material to be fireproofed is not limited. Examples include plywood, veneer board single plates, laminated lumber, particle boards, fiber boards, etc., each of which is produced by using, as a raw material, wood that is mechanically crushed or cut, or chemically treated into the shape of strips (e.g., chips and strands) or wood wool, etc.; plate materials cut from natural wood; paper; pulp; and the like. The application of the woody material is also not limited, and furniture, housing construction materials, etc., can be used as woody materials. The type of wood is also not limited. Examples include maple, oak, paulownia, chestnut, zelkova, beech, birch, swamp ash, cedar, cypress, pine, ginkgo, juniper, hemlock, and the like.

3. Method for Producing Flame-Retardant Woody Material

A known method can be used as the treatment method for fireproofing woody materials. For example, application, coating, impregnation, injection, or the like can be used. Among these, treatment methods by impregnation and injection are preferable.

When impregnation treatment and/or injection treatment is performed, it is preferable to use a solution in which the flame retardant for woody materials is dissolved in a solvent, or a suspension in which the flame retardant for woody materials is dispersed in a solvent. Examples of solvents include water, methanol, ethanol, ethyl acetate, acetone, benzene, toluene, xylene, chlorobenzene, carbon disulfide, and the like.

The method for performing impregnation treatment is not limited. Examples include an impregnation treatment method by pressurization, an impregnation treatment method by depressurization, an impregnation treatment method by ordinary pressure, and a combination of these impregnation treatment methods. Any of these methods may be used; however, in terms of the ease of injecting the flame retardant for woody materials, at least an impregnation treatment method by pressurization or an impregnation treatment method by depressurization is preferably included, and at least an impregnation treatment method by depressurization is more preferably included. Pressurization is generally performed at about 200 to 3000 kPa, and preferably about 400 to 2000 kPa Depressurization is generally performed at about 0.1 to 50 kPa, and preferably about 2 to 30 kPa The impregnation treatment time is not limited, and can be suitably changed in accordance with the size of the woody material to be fireproofed. For example, the impregnation treatment time is about 5 minutes to 24 hours.

When impregnation treatment is performed, the temperature of a solution of the flame retardant for woody materials is not limited. The temperature of the solution may be room temperature (about 15 to 25° C.), or may be adjusted within the range of 25 to 100° C., if necessary.

In the flame-retardant woody material of the present invention, the amount of impregnation of the flame retardant for woody materials can be suitably adjusted depending on the required flame-retardant performance. The impregnation amount is expressed by the mass (unit: $kg/m^3$ or $g/cm^3$) of the flame retardant for woody materials injected per unit volume of the woody material. Moreover, the mass of the flame retardant for woody materials injected into a dry woody material can be expressed by an impregnation ratio represented by the following formula (a). Therefore, the amount of the flame retardant for woody materials to be injected is adjusted so that a desired impregnation ratio (e.g., 20% or more) is achieved.

$$\text{(Impregnation ratio (\%))} = \frac{\text{(Mass of flame retardant for woody materials contained in flame-retardant woody material (g))}}{\text{(Mass of woody material (g))}} \times 100 = \frac{\text{(Mass of flame-retardant woody material test piece (g)} - \text{(Mass of test piece after initial drying (g))}}{\text{(Mass of test piece after initial drying (g))}} \times 100 \quad \text{(a)}$$

The lower limit of the impregnation ratio is preferably 40% or more, and more preferably 80% or more. The upper limit of the impregnation ratio is not limited, and is preferably 170% or less, and more preferably 130% or less.

When impregnation treatment is performed, the woody material to be treated is preferably dried beforehand. The king method may be any of solar king, forced king using a heating furnace, etc. As the degree of drying, in general, king is preferably performed as much as possible within a range in which curves, cracks, etc., do not occur in wood.

The woody material after impregnation treatment is preferably dried. The drying temperature is generally about 30 to 150° C., and preferably about 50 to 100° C. The drying furnace may be any furnace, as long as it can perform heating at a temperature equal to or higher than the boiling point of the solvent. For example, a hot-air drying furnace, an infrared drying furnace, or the like can be used. Moreover, the woody material after impregnation treatment may be subjected to curing treatment in a wet state before drying. When the woody material after impregnation treatment is subjected to curing treatment before drying, the flame retardant for woody materials of the present invention can infiltrate into the inside of the woody material, thereby further suppressing hygroscopicity.

The flame-retardant woody material of the present invention may contain known additives, other than the flame retardant for woody materials, if necessary. Examples of such additives include dyes, coloring pigments, antifoaming agents, dispersants, emulsifiers, penetrants, salt compounds, and the like. These additives are added to a flame retardant solution used for impregnation treatment, and impregnation treatment is performed, whereby effects other than flame retardancy can be imparted to the woody material. The amounts of the above additives may be suitably adjusted within a range that does not inhibit the flame retardancy of the woody material.

The flame-retardant woody material of the present invention has excellent flame retardancy and suppressed hygroscopicity. Therefore, the flame-retardant woody material of the present invention can be directly used as the interior and exterior, furniture wood, engineering foundation materials, etc., of houses, stores, and other building structures. Moreover, the surface of the woody material can be waterproof-coated with a known waterproofing agent.

EXAMPLES

The present invention is described in more detail below with reference to Examples and Comparative Examples; however, these Examples do not limit the scope of the present invention The acid value (KOHmg/g) of the organic phosphorous compound (1) used in the following Examples was measured in accordance with the potentiometric titration method of JIS K0070. For titration, Hiranuma Automatic Titrator COM-1700 (produced by Hiranuma Sangyo Co., Ltd.) was used.

Example 1

A flame-retardant woody material test piece was produced in the following manner.
(1) Preparation of Flame Retardant Solution for Woody Materials 64.9 g of 60 mass % 1-hydroxyethane-1,1-diphosphonic acid (hereinafter abbreviated as "HEDP") aqueous solution (produced by Tokyo Chemical Industry Co., Ltd.) (acid value: 507 mg-KOH/g) and 685.6 g of water were taken in a container. While stirring the mixture, 61.2 g (1.16 molar equivalents relative to the acid value of HEDP) of guanidine carbonate (produced by Tokyo Chemical Industry Co., Ltd.) was added, thereby preparing a flame retardant aqueous solution for woody materials (solids content: 10 mass %).

(2) Production of Flame-Retardant Woody Material Test Piece

The woody material used herein was a cedar sapwood cross-grained timber (100 mm×100 mm×18 mm). This woody material was sufficiently dried in a ventilation oven at 60° C., and the mass $W_i$ after initial drying was weighed. The woody material was submerged in the flame retardant aqueous solution. The pressure was reduced to 5 to 7 kPa for 3 to 4 hours using a pressure-reducing device at room temperature (20° C.), and then returned to ordinary pressure; and the woody material was immersed at room temperature overnight to perform impregnation treatment. Thereafter, the woody material after impregnation treatment was taken out from the flame retardant solution, and dried to a constant mass in a ventilation oven at 60° C., thereby obtaining a flame-retardant woody material. The mass $W_t$ of the flame-retardant woody material test piece was measured, and the impregnation ratio was determined by the following formula (a).

$$\begin{aligned}(\text{Impregnation ratio (\%)}) = & \\ \frac{(\text{Mass of flame retardant for woody materials contained in flame-retardant woody material (g)})}{(\text{Mass of woody material (g)})} & \times 100 = \\ \frac{(\text{Mass of flame-retardant woody material test piece (g)}) - (\text{Mass of test piece after initial drying (g)})}{(\text{Mass of test piece after initial drying (g)})} & \times 100 = \\ \frac{W_t - W_i}{W_i} \times 100 & \end{aligned} \qquad (a)$$

Example 2

A flame-retardant woody material test piece was produced in the same manner as in Example 1, except that 147.9 g of 60 mass % HEDP aqueous solution (acid value: 507 mg-KOH/g), 661.2 g of water, and 139.5 g (1.16 molar equivalents relative to the acid value of HEDP) of guanidine carbonate were used to prepare a flame retardant aqueous solution for woody materials (solids content: 20 mass %).

Example 3

A flame-retardant woody material test piece was produced in the same manner as in Example 1, except that 246.6 g of 60 mass % HEDP aqueous solution (acid value: 511 mg-KOH/g), 586 g of water, and 232.6 g (1.15 molar equivalents relative to the acid value of HEDP) of guanidine carbonate were used to prepare a flame retardant aqueous solution for woody materials (solids content: 30 mass %).

Example 4

A flame-retardant woody material test piece was produced in the same manner as in Example 1, except that 215.3 g of 60 mass % HEDP aqueous solution (acid value: 511 mg-KOH/g), 368.5 g of water, and 176.4 g (1 molar equivalent relative to the acid value of HEDP) of guanidine carbonate were used to prepare a flame retardant aqueous solution for woody materials (solids content: 35 mass %).

Example 5

A flame-retardant woody material test piece was produced in the same manner as in Example 1, except that 78.7 g of 60 mass % HEDP aqueous solution (acid value: 517 mg-KOH/g), 778.5 g of water, and 65.3 g (1 molar equivalent relative to the acid value of HEDP) of guanidine carbonate were used to prepare a flame retardant aqueous solution for woody materials (solids content: 10 mass %).

Example 6

A flame-retardant woody material test piece was produced in the same manner as in Example 1, except that 63.5 g of 60 mass % HEDP aqueous solution (acid value: 517 mg-KOH/g), 784.7 g of water, and 79.0 g (1.5 molar equivalents relative to the acid value of HEDP) of guanidine carbonate were used to prepare a flame retardant aqueous solution for woody materials (solids content: 10 mass %).

Example 7

A flame-retardant woody material test piece was produced in the following manner.

(1) Preparation of Flame Retardant Solution for Woody Materials 555.0 g of 60 mass % HEDP aqueous solution (acid value: 505 mg-KOH/g) and 1248.2 g of water were taken in a container. While stirring the mixture, 360.4 g (0.8 molar equivalents relative to the acid value of HEDP) of guanidine carbonate (produced by Tokyo Chemical Industry Co., Ltd.) was added, thereby preparing a flame retardant aqueous solution for woody materials (solids content: 29 mass %).

(2) Production of Flame-Retardant Woody Material Test Piece

The woody material used herein was a cedar sapwood cross-grained timber (100 mm×100 mm×18 mm). This woody material was sufficiently dried in a ventilation oven at 60° C., and the mass $W_i$ after initial drying was weighed. The woody material was submerged in the flame retardant aqueous solution. The pressure was reduced to 5 to 7 kPa for 3 to 4 hours using a pressure-reducing device at room temperature (20° C.), and then returned to ordinary pressure; and the woody material was immersed at 60° C. overnight to perform impregnation treatment. Thereafter, the woody material after impregnation treatment was taken out from the flame retardant solution, and subjected to curing treatment at room temperature (23° C.) for 4 days. Then, the woody material was placed in a ventilation oven and dried at 40° C. for 4 days, followed by drying to a constant mass at 60° C., thereby obtaining a flame-retardant woody material. The mass $W_t$ of the flame-retardant woody material test piece was measured, and the impregnation ratio was determined by the above formula (a).

Example 8

A flame-retardant woody material test piece was produced in the same manner as in Example 7, except that 493.3 g of 60 mass % HEDP aqueous solution (acid value: 505 mg-KOH/g), 1200.2 g of water, and 360.3 g (0.9 molar equivalents relative to the acid value of HEDP) of guanidine carbonate were used to prepare a flame retardant aqueous solution for woody materials (solids content: 28 mass %).

Example 9

A flame-retardant woody material test piece was produced in the same manner as in Example 1, except that 26.0 g of 60 mass % HEDP aqueous solution (acid value: 507 mg-KOH/g), 591.2 g of water, and 24.5 g (1.16 molar equivalents relative to the acid value of HEDP) of guanidine carbonate were used to prepare a flame retardant aqueous solution for woody materials (solids content: 5 mass %).

Comparative Example 1

A flame-retardant woody material test piece was produced in the same manner as in Example 1, except that 237.0 g of 60 mass % HEDP aqueous solution (acid value: 527 mg-KOH/g), 527.9 g of water, and 135.1 g (1 molar equivalent relative to the acid value of HEDP) of 28 mass % aqueous ammonia (produced by Wako Pure Chemical Industries, Ltd.) were used to prepare a flame retardant aqueous solution for woody materials (solids content: 20 mass %).

Comparative Example 2

A flame retardant aqueous solution for woody materials comprising boric acid as a main component was prepared with reference to PTL 2 (JP2007-55271A) mentioned above. After 900 g of water was placed in a container and heated to 90° C., 350 g of borax (sodium tetraborate decahydrate) (produced by Kishida Chemical Co., Ltd.), 5 g of aluminum phosphate (produced by Kishida Chemical Co., Ltd.), and 150 g of boric acid (produced by Kishida Chemical Co., Ltd.) were added. The resulting mixture was stirred until the liquid became transparent. Further, the liquid was heated to a liquid temperature of 92° C., thereby preparing a flame retardant aqueous solution for woody materials (solids content: 36 mass %). Then, a flame-retardant woody material test piece was produced in the same manner as in Example 1.

Comparative Example 3

A flame retardant aqueous solution for woody materials comprising guanidine phosphate was prepared with reference to PTL 5 (JP2007-160570A) mentioned above. 195 g of 85 mass % phosphoric acid aqueous solution (produced by Kishida Chemical Co., Ltd.) and 822.9 g of water were taken in a container. While stirring the mixture, 240.5 g of guanidine carbonate was added, thereby preparing a flame retardant aqueous solution for woody materials (solids content: 27.5 mass %). Then, a flame-retardant woody material test piece was produced in the same manner as in Example 1.

Comparative Example 4

The test piece used herein was a woody material that was dried to a constant mass in a ventilation oven at 60° C., without performing impregnation treatment with a flame retardant aqueous solution for woody materials.

The following exothermic test and hygroscopicity test were performed on the flame-retardant woody material test pieces of Examples 1 to 9 and Comparative Examples 1 to 4.

Exothermic Test

The exothermic test was performed according to ISO 5660. The test was conducted using a cone calorimeter, and flame retardancy was evaluated based on the following three criteria. The irradiance was 50 kW/m².

(1) The total heat release was 8 MJ/m² or less.
(2) The maximum heat release rate did not exceed 200 kW/m² continuously for 10 seconds or more.
(3) There were no cracks or holes penetrating to the back surface, which were harmful in terms of fire prevention.

The test pieces that satisfied the above three criteria for 20 minutes were evaluated as "incombustible materials," for 10 minutes as "semi-incombustible materials," for 5 minutes as "flame-retardant materials," and for 2 minutes and 30 seconds as "semi-flame-retardant materials"; and the test pieces that did not satisfy any of these criteria were evaluated as "failed." Table 1 shows the results.

Hygroscopicity Test

The flame-retardant woody materials were each allowed to stand to a constant mass in a thermo-hygrostat at 40° C. and 90% RH, and hygroscopicity was determined by the following formula $$\text{(Hygroscopicity (\%))} = \frac{\text{(Mass of water in flame-retardant woody material (g))}}{\text{(Mass of test piece after initial drying (g))}} = \frac{\text{Mass of test piece after hygroscopicity test (g)} - \text{Mass of test piece before hygroscopicity test (g)}}{\text{(Mass of test piece after initial drying (g))}} \quad (b)$$

The woody materials with a hygroscopicity of 25% or less were evaluated as "3," a hygroscopicity exceeding 25% and 30% or less as "2," a hygroscopicity exceeding 30% and 40% or less as "1," and a hygroscopicity exceeding 40% as "0." Table 1 shows the results.

Example 10

A flame-retardant woody material test piece was produced in the following manner.

(1) Preparation of Flame Retardant Solution for Woody Materials 268.4 g of 60 mass % HEDP aqueous solution (acid value: 505 mg-KOH/g), 69.1 g of pyrophosphoric acid (acid value: 1166 mgKOH/g, produced by Kishida Chemical Co., Ltd.) (mass ratio of HEDP:pyrophosphoric acid=70:30), and 1003.5 g of water were taken in a container, and stirred until it was dissolved. While stirring, 347.0 g of guanidine carbonate (produced by Tokyo Chemical Industry Co., Ltd.) was added to the aqueous solution, thereby preparing a flame retardant aqueous solution for woody materials (solids content: 30 mass %).

The amount of guanidine carbonate at 1 molar equivalent relative to the acid value of HEDP was 217.6 g, and the amount of guanidine carbonate at 1 molar equivalent relative to the acid value of pyrophosphoric acid was 129.4 g. Thus, the required amount (sum of both amounts) of guanidine carbonate was determined to be 347.0 g. Therefore, the flame retardant aqueous solution for woody materials of Example 10 contains guanidine in an amount equivalent to the sum of both amounts.

(2) Production of Flame-Retardant Woody Material Test Piece

The woody material used herein was a cedar sapwood cross-grained timber (100 mm×100 mm×18 mm). This woody material was sufficiently dried in a ventilation oven at 60° C., and the mass $W_i$ after initial drying was weighed. The woody material was submerged in the flame retardant

TABLE 1

| | Impregnation ratio (%) | Hygroscopicity test (%) | Determination | Total heat release (MJ/m²) 2 min 30 sec | 5 min | 10 min | 20 min | Maximum heat release rate (kW/m²) | Determination |
|---|---|---|---|---|---|---|---|---|---|
| Example 1 | 24 | 18 | 3 | — | 2.46 | 5.30 | 13.30 | 42.17 | Semi-incombustible material |
| Example 2 | 46 | 21 | 3 | — | 1.38 | 2.95 | 18.70 | 41.36 | Semi-incombustible material |
| Example 3 | 85 | 21 | 3 | — | 1.90 | 2.82 | 6.47 | 9.15 | Incombustible material |
| Example 4 | 109 | 22 | 3 | — | 0.28 | 0.91 | 3.98 | 8.17 | Incombustible material |
| Example 5 | 23 | 17 | 3 | — | 6.51 | 17.91 | 40.33 | 75.00 | Flame-retardant material |
| Example 6 | 27 | 16 | 3 | — | 2.17 | 5.52 | 14.75 | 22.87 | Semi-incombustible material |
| Example 7 | 76 | 18 | 3 | — | 1.07 | 2.06 | 6.07 | 10.26 | Incombustible material |
| Example 8 | 101 | 18 | 3 | — | 0.69 | 1.75 | 6.30 | 12.58 | Incombustible material |
| Example 9 | 16 | 15 | 3 | 6.37 | 12.26 | 25.06 | 47.42 | 101.00 | Semi-flame-retardant material |
| Comparative Example 1 | 51 | 42 | 0 | — | 1.40 | 4.27 | 11.98 | 19.11 | Semi-incombustible material |
| Comparative Example 2 | 54 | 58 | 0 | — | 0.96 | 1.60 | 3.88 | 9.08 | Incombustible material |
| Comparative Example 3 | 63 | 48 | 0 | — | 0.81 | 2.61 | 8.62 | 12.10 | Semi-incombustible material |
| Comparative Example 4 | — | 15 | 3 | 9.63 | 18.28 | 41.31 | 61.05 | 126.85 | Failed |

Table 1 revealed that the hygroscopicity of the flame-retardant woody material test pieces of Comparative Examples 1 to 3 was higher than that of Examples 1 to 9.

In contrast, the flame-retardant woody material test pieces of Examples 1 to 9 had sufficiently low hygroscopicity, and the exothermic test evaluated their flame-retardant performance as being equal to or higher than "semi-flame-retardant materials."

aqueous solution. The pressure was reduced to 5 to 7 kPa for 3 to 4 hours using a pressure-reducing device at room temperature (23° C.), and then returned to ordinary pressure; and the woody material was immersed at room temperature overnight to perform impregnation treatment. Thereafter, the woody material after impregnation treatment was taken out from the flame retardant solution, and subjected to curing treatment at room temperature (23° C.) for 4 days. Then, the woody material was placed in a ventilation oven and dried at 40° C. for 4 days, followed by drying to a constant mass at 60° C., thereby obtaining a flame-retardant woody material. The mass $W_t$ of the flame-retardant woody material test piece was measured, and the impregnation ratio was determined by the above formula (a).

Example 11

A flame-retardant woody material was obtained in the same manner as in Example 10, except that 249.9 g of 60 mass % HEDP aqueous solution (acid value: 505 mg-KOH/g), 150.0 g of pyrophosphoric acid (acid value: 1166 mg-KOH/g, mass ratio of HEDP:pyrophosphoric acid=50:50), 849.8 g of water, and 483.8 g of guanidine carbonate were used to prepare a flame retardant aqueous solution for woody materials (solids content: 42 mass %). The amount of guanidine carbonate at 1 molar equivalent relative to the acid value of HEDP was 202.6 g, and the amount of guanidine carbonate at 1 molar equivalent relative to the acid value of pyrophosphoric acid was 280.9 g. Thus, the required amount (sum of both amounts) of guanidine carbonate was determined to be 483.5 g. Therefore, the flame retardant aqueous solution for woody materials of Example 11 contains guanidine in an amount equivalent to the sum of both amounts.

Example 12

A flame-retardant woody material was obtained in the same manner as in Example 10, except that 90.0 g of 60 mass % HEDP aqueous solution (acid value: 505 mg-KOH/g), 126.06 g of pyrophosphoric acid (acid value: 1172 mg-KOH/g, mass ratio of HEDP:pyrophosphoric acid=30:70), 999.2 g of water, and 310.2 g of guanidine carbonate were used to prepare a flame retardant aqueous solution for woody materials (solids content: 27 mass %). The amount of guanidine carbonate at 1 molar equivalent relative to the acid value of HEDP was 73.0 g, and the amount of guanidine carbonate at 1 molar equivalent relative to the acid value of pyrophosphoric acid was 237.2 g. Thus, the required amount (sum of both amounts) of guanidine carbonate was determined to be 310.2 g. Therefore, the flame retardant aqueous solution for woody materials of Example 12 contains guanidine in an amount equivalent to the sum of both amounts.

Example 13

A flame-retardant woody material was obtained in the same manner as in Example 10, except that 30.0 g of 60 mass % HEDP aqueous solution (acid value: 505 mg-KOH/g), 162.0 g of pyrophosphoric acid (acid value: 1172 mg-KOH/g, mass ratio of HEDP:pyrophosphoric acid=10:90), 1058.6 g of water, and 329.3 g of guanidine carbonate were used to prepare a flame retardant aqueous solution for woody materials (solids content: 27 mass %). The amount of guanidine carbonate at 1 molar equivalent relative to the acid value of HEDP was 24.3 g, and the amount of guanidine carbonate at 1 molar equivalent relative to the acid value of pyrophosphoric acid was 304.9 g. Thus, the required amount (sum of both amounts) of guanidine carbonate was determined to be 329.2 g. Therefore, the flame retardant aqueous solution for woody materials of Example 13 contains guanidine in an amount equivalent to the sum of both amounts.

Example 14

A flame-retardant woody material was obtained in the same manner as in Example 10, except that 166.7 g of 60 mass % HEDP aqueous solution (acid value: 505 mg-KOH/g), 100.0 g of phosphoric acid (acid value: 971.2 mgKOH/g, produced by Kishida Chemical Co., Ltd.) (mass ratio of HEDP:phosphoric acid=50:50), 984.2 g of water, and 291.3 g of guanidine carbonate were used to prepare a flame retardant aqueous solution for woody materials (solids content: 30 mass %). The amount of guanidine carbonate at 1 molar equivalent relative to the acid value of HEDP was 135.2 g, and the amount of guanidine carbonate at 1 molar equivalent relative to the acid value of phosphoric acid was 156.0 g. Thus, the required amount (sum of both amounts) of guanidine carbonate was determined to be 291.2 g. Therefore, the flame retardant aqueous solution for woody materials of Example 14 contains guanidine in an amount equivalent to the sum of both amounts.

Example 15

246.6 g of 60 mass % HEDP aqueous solution (acid value: 511 mg-KOH/g), 660.3 g of water, and 202.4 g (1 molar equivalent relative to the acid value of HEDP) of guanidine carbonate were used to prepare a flame retardant aqueous solution for woody materials (solids content: 27 mass %). The amount of guanidine carbonate at 1 molar equivalent relative to the acid value of HEDP was determined to be 202.4 g. Therefore, the flame retardant aqueous solution for woody materials of Example 15 contains guanidine in an amount equivalent to HEDP.

Comparative Example 5

180.3 g of pyrophosphoric acid (acid value: 1172 mg-KOH/g), 1089.1 g of water, and 339.3 g of guanidine carbonate were used to prepare a flame retardant aqueous solution for woody materials (solids content: 27 mass %). The amount of guanidine carbonate at 1 molar equivalent relative to the acid value of pyrophosphoric acid was determined to be 339.3 g. Therefore, the flame retardant aqueous solution for woody materials of Comparative Example 5 contains guanidine in an amount equivalent to pyrophosphoric acid.

Storage Stability Test

The flame retardant aqueous solutions for woody materials prepared in Examples 10 to 15 and Comparative Example 5 were allowed to stand at room temperature (23° C.), and their conditions after the elapse of time were confirmed by visual observation. Cases in which there was no crystal precipitation for 7 days or more were evaluated as "2"; cases in which there was no crystal precipitation for 5 days or more were evaluated as "1"; and cases in which there was crystal precipitation within 5 days were evaluated as "0." Table 2 shows the results.

TABLE 2

|  | Storage stability test |
|---|---|
| Example 10 | 2 |
| Example 11 | 2 |
| Example 12 | 2 |
| Example 13 | 2 |
| Example 14 | 2 |
| Example 15 | 1 |
| Comparative Example 5 | 0 |

Table 2 revealed that the flame retardant aqueous solutions for woody materials of Examples 10 to 14, which further contained the inorganic phosphorus compound (3), had significantly excellent storage stability. In particular, the flame retardant aqueous solution for woody materials of Example 11 was a solution containing a high concentration of the flame retardant for woody materials, and crystal precipitation was not observed when this solution was allowed to stand for 7 days or more in this state. This reveals that its storage stability is significantly excellent.

The above exothermic test and hygroscopicity test were performed on the flame-retardant woody material test pieces of Examples 10 to 14. Table 3 shows the results.

TABLE 3

| | Impregnation ratio (%) | Hygroscopicity test (%) | | Exothermic test | | | | |
|---|---|---|---|---|---|---|---|---|
| | | | Determination | Total heat release (MJ/m$^2$) | | | Maximum heat release rate (kW/m$^2$) | Determination |
| | | | | 5 min | 10 min | 20 min | | |
| Example 10 | 120 | 30 | 2 | 0.03 | 0.28 | 2.74 | 6.35 | Incombustible material |
| Example 11 | 121 | 27 | 2 | 0.23 | 1.11 | 4.37 | 6.95 | Incombustible material |
| Example 12 | 80 | 30 | 2 | 0.62 | 2.36 | 8.27 | 13.05 | Semi-incombustible material |
| Example 13 | 77 | 30 | 2 | 0.53 | 1.42 | 6.91 | 13.52 | Incombustible material |
| Example 14 | 101 | 25 | 3 | 0.42 | 1.54 | 5.61 | 10.01 | Incombustible material |

Table 3 shows that the flame-retardant woody material test pieces of Examples 10 to 14 had sufficiently low hygroscopicity, and the exothermic test evaluated their flame-retardant performance as being equal to or higher than "semi-flame-retardant materials" Tables 2 and 3 reveal that the flame-retardant woody material test pieces of Examples 10 to 14, which further contained the inorganic phosphorus compound (3), in addition to the organic phosphorous compound (1) and the nitrogen compound (2), maintained flame retardancy and low hygroscopicity superior to that of conventional products, and also had excellent storage stability. In particular, the total heat release of the flame-retardant woody material test piece of Example 11 in the exothermic test was further reduced, due to the use of the higher-concentration flame retardant aqueous solution for woody materials. It was confirmed that further higher fireproofing was achieved.

The invention claimed is:

1. A flame-retardant woody material comprising a woody material that is fireproofed with a flame retardant for woody materials,
wherein
the flame retardant for woody materials comprises:
an organic phosphorous compound represented by formula (1):

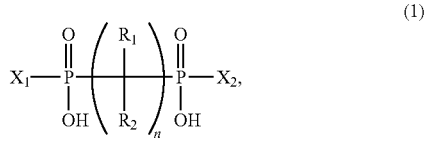
(1)

in which $R_1$ and $R_2$ are the same or different and each represent a hydrogen atom, amino, hydroxy, mercapto, a halogen atom, or substituted or unsubstituted $C_{1-6}$ alkyl, the substituted alkyl having one or more substituents selected from the group consisting of amino, hydroxy, mercapto, and a halogen atom, and the substituted or unsubstituted alkyl optionally containing, in its carbon chain, at least one heteroatom selected from the group consisting of an oxygen atom, a nitrogen atom, and a sulfur atom; n is an integer of 1 to 4; and $X_1$ and $X_2$ are the same or different and each represent a hydrogen atom, hydroxy, or $C_{1-6}$ alkyl unsubstituted or substituted with hydroxy; and a nitrogen compound or salt thereof, the nitrogen compound being represented by formula (2):

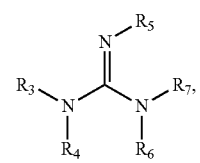
(2)

in which $R_3$ represents a hydrogen atom, methyl, ethyl, n-propyl, or isopropyl; $R_4$, $R_5$, and $R_6$ are the same or different and each represent a hydrogen atom, methyl, ethyl, n-propyl, isopropyl, phenyl, o-tolyl, m-tolyl, or p-tolyl; and $R_7$ represents a hydrogen atom, methyl, ethyl, n-propyl, isopropyl, amino, cyano, nitro, nitroso, —C(=O)—NH$_2$, or —C(=NH)—NH$_2$;
the nitrogen compound and the organic phosphorous compound are bonded together to form a salt; and
the nitrogen compound or salt thereof is contained in an amount of 0.7 molar equivalents or more and 1.6 molar equivalents or less relative to the acid value of the organic phosphorous compound.

2. The flame-retardant woody material according to claim 1, in the woody material, comprising the flame retardant woody materials at an impregnation ratio of 5% or more, the impregnation ratio being represented by the following formula (a):

$$\text{(Impregnation ratio (\%))} = \frac{\text{(Mass of flame retardant for woody materials contained in flame-retardant woody material (g))}}{\text{(Mass of woody material (g))}} \times 100. \quad \text{(a)}$$

3. The flame-retardant woody material according to claim 2, wherein the impregnation ratio is 20% or more.

4. The flame-retardant woody material according to claim 2, wherein the impregnation ratio is 40% or more.

5. The flame-retardant woody material according to claim 2, wherein the impregnation ratio is 80% or more.

6. The flame-retardant woody material according to claim 1, wherein the organic phosphorous compound is a compound of the formula (1), wherein:
$R_1$ is a hydrogen atom or hydroxy,
$R_2$ is a hydrogen atom or $C_1$-6 alkyl,
$X_1$ and $X_2$ are hydroxy, and
n is 1.

7. The flame-retardant woody material according to claim 1, wherein the nitrogen compound or salt thereof is a compound of the formula (2) or salt thereof, wherein:
$R_3$, $R_4$, $R_5$, and $R_6$ are hydrogen atoms, and
$R_7$ is a hydrogen atom, amino, cyano, nitro, nitroso, —C(=O)—$NH_2$, or —C(=NH)—$NH_2$.

8. A flame-retardant woody material comprising a woody material that is fireproofed with a flame retardant for woody materials,
wherein the flame retardant for woody materials comprising:
an organic phosphorous compound represented by formula (1):

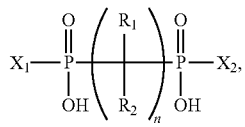
(1)

in which $R_1$ and $R_2$ are the same or different and each represent a hydrogen atom, amino, hydroxy, mercapto, a halogen atom, or substituted or unsubstituted $C_{1-6}$ alkyl; the substituted alkyl having one or more substituents selected from the group consisting of amino, hydroxy, mercapto, and a halogen atom; and the substituted or unsubstituted alkyl optionally containing, in its carbon chain, at least one heteroatom selected from the group consisting of an oxygen atom, a nitrogen atom, and a sulfur atom; n is an integer of 1 to 4; and $X_1$ and $X_2$ are the same or different and each represent a hydrogen atom, hydroxy, or $C_{1-6}$ alkyl unsubstituted or substituted with hydroxy;
a nitrogen compound or salt thereof, the nitrogen compound being represented by formula (2):

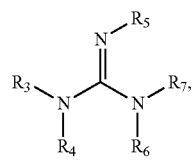
(2)

in which $R_3$ represents a hydrogen atom, methyl, ethyl, n-propyl, or isopropyl; $R_4$, $R_5$, and $R_6$ are the same or different and each represent a hydrogen atom, methyl, ethyl, n-propyl, isopropyl, phenyl, o-tolyl, m-tolyl, or p-tolyl; $R_7$ represents a hydrogen atom, methyl, ethyl, n-propyl, isopropyl, amino, cyano, nitro, nitroso, —C(=O)—$NH_2$, or —C(=NH)—$NH_2$; and the nitrogen compound and the organic phosphorous compound are bonded together to form a salt; and an inorganic phosphorus compound represented by formula (3):

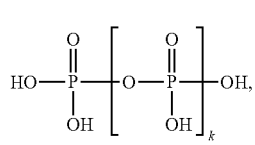
(3)

in which k is an integer of 0 or more and 100 or less.

9. The flame-retardant woody material according to claim 8, in the woody material, comprising the flame retardant for woody materials at an impregnation ratio of 5% or more, the impregnation ratio being represented by the following formula (a):

$$\text{(Impregnation ratio (\%))} = \frac{\text{(Mass of flame retardant for woody materials contained in flame-retardant woody material (g))}}{\text{(Mass of woody material (g))}} \times 100. \quad (a)$$

10. The flame-retardant woody material according to claim 9, wherein the impregnation ratio is 20% or more.

11. The flame-retardant woody material according to claim 9, wherein the impregnation ratio is 40% or more.

12. The flame-retardant woody material according to claim 9, wherein the impregnation ratio is 80% or more.

13. The flame retardant woody material according to claim 8, wherein the organic phosphorous compound is a compound of the formula (1), wherein:
$R_1$ is a hydrogen atom or hydroxy,
$R_2$ is a hydrogen atom or $C_{1-6}$ alkyl,
$X_1$ and $X_2$ are hydroxy, and
n is 1.

14. The flame retardant woody material according to claim 8, wherein the nitrogen compound or salt thereof is a compound of the formula (2) or salt thereof, wherein:
$R_3$, $R_4$, $R_5$, and $R_6$ are hydrogen atoms, and
$R_7$ is a hydrogen atom, amino, cyano, nitro, nitroso, —C(=O)—$NH_2$, or —C(=NH)—$NH_2$.

15. The flame retardant woody material according to claim 8, wherein the nitrogen compound or salt thereof is contained in an amount of 0.95 times or more and 1.4 times or less the sum of 1 molar equivalent relative to the acid value of the organic phosphorous compound and 1 molar equivalent relative to the acid value of the inorganic phosphorous compound.

16. The flame retardant woody material according to claim 8, wherein the nitrogen compound or salt thereof is contained in an amount of 0.97 times or more and 1.2 times or less the sum of 1 molar equivalent relative to the acid value of the organic phosphorous compound and 1 molar equivalent relative to the acid value of the inorganic phosphorous compound.

17. The flame retardant woody material according to claim 8, wherein the inorganic phosphorous compound is a compound of the formula (3), wherein k is 0 or 1.

18. The flame retardant woody material according to claim 8, wherein the mixing ratio of the organic phosphorous compound and the inorganic phosphorous compound is 1:99 to 75:25 by a mass ratio.

* * * * *